(12) United States Patent
Houdayer et al.

(10) Patent No.: US 10,480,579 B2
(45) Date of Patent: Nov. 19, 2019

(54) BEARING CAGE, RADIAL BEARING ASSEMBLY WITH SUCH A CAGE, IN PARTICULAR FOR A BALANCING SHAFT

(71) Applicant: Aktiebolaget SKF, Gothenburg (SE)

(72) Inventors: Christophe Houdayer, Semblancay (FR); Charles Chambonneau, Ballan Miré (FR); Philippe Walter, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/026,725

(22) Filed: Jul. 3, 2018

(65) Prior Publication Data

US 2019/0024716 A1  Jan. 24, 2019

(30) Foreign Application Priority Data

Jul. 24, 2017  (DE) .......... 10 2017 212 688

(51) Int. Cl.
*F16C 33/50*  (2006.01)
*F16C 33/46*  (2006.01)

(52) U.S. Cl.
CPC ........ *F16C 33/467* (2013.01); *F16C 33/4623* (2013.01); *F16C 33/50* (2013.01); *F16C 2226/74* (2013.01)

(58) Field of Classification Search
CPC ....... F16C 33/50; F16C 33/502; F16C 33/504
See application file for complete search history.

(56) References Cited

U.S. PATENT DOCUMENTS

| 2,033,074 | A | * | 3/1936 | Herrmann | ................. F16C 9/04 |
| | | | | | 384/548 |
| 4,239,304 | A | * | 12/1980 | Wakunami | ............ F16C 33/504 |
| | | | | | 384/573 |
| 8,894,293 | B2 | | 11/2014 | Beck et al. | |
| 9,249,832 | B2 | * | 2/2016 | Friedrich | ............... F16C 33/504 |
| 9,623,474 | B2 | * | 4/2017 | Steblau | .................. B21D 53/12 |
| 9,638,250 | B2 | * | 5/2017 | Steblau | ............... F16C 33/4623 |

FOREIGN PATENT DOCUMENTS

EP        2014935 A1    1/2009

\* cited by examiner

*Primary Examiner* — Phillip A Johnson
(74) *Attorney, Agent, or Firm* — Garcia-Zamor Intellectual Property Law, LLC; Ruy Garcia-Zamor; Bryan Peckjian

(57) ABSTRACT

A bearing cage for rolling element bearings, that is annular and centered on a central axis. The bearing cage provides a plurality of circumferentially adjacent pockets dedicated to receive each a rolling element. The bearing cage being split in the circumferential direction along a line of separation to define a first side and a second side that are circumferentially separated from each other. The first side and second side having fixing means to fix the first side and second side to each other such that the bearing cage can have different diameters.

10 Claims, 6 Drawing Sheets

BEARING CAGE, RADIAL BEARING ASSEMBLY WITH SUCH A CAGE, IN PARTICULAR FOR A BALANCING SHAFT

CROSS-REFERENCE

This application claims priority to German patent application no. 102017212688.4 filed on Jul. 24, 2017, the contents of which are fully incorporated herein by reference.

TECHNOLOGICAL FIELD

The present invention relates to a bearing cage for use in a rolling-element bearing, maintained rolling elements between an outer part and an inner part in relative rotating movement. The invention also related to a radial bearing assembly comprising such a bearing cage, in particular for supporting a balancing shaft in a housing dedicated to be used in a motor vehicle.

BACKGROUND

A rolling-element bearing can be of a radial bearing assembly type for supporting an outer part with respect to an inner part as it is known from the prior art, for example from EP-A1-2014935.

This reference describes an arrangement in which the outer part and the inner part rotate with respect to each other about a common longitudinal axis, rollers being radially arranged between the outer and inner parts.

Rollers are advantageously arranged in circumferentially adjacent pockets of an annular bearing cage, the cage being housed between the outer and inner parts. The bearing cage maintains the rollers axially and circumferentially equally spaced and thus enables a uniform load distribution as well as a quiet and smooth running of the bearing. Such bearing cage also prevents direct contact between neighboring rolling elements and thus reduces friction and heat generation in the rolling-element bearing.

A bearing seat is formed on the inner part of the bearing assembly and on which rollers roll. Bearing seat includes a load zone that is subject to a radial load that is substantially stationary relative to the bearing seat. In particular, load zones of this type occur on bearing seats of balancing shafts, more precisely shafts having a center of gravity that is not rotationally symmetric relative to the longitudinal axis about which the shaft rotates in a housing. Such inner parts provided with bearing seats can be formed integrally with a rotating shaft, such as a balancing shaft to be used in a motor vehicle, or separately and mounted on a rotating shaft.

Outer part of a radial bearing assembly supporting in rotation a balancing shaft is stationary and fixed in a housing, the inner part being in rotating movement with respect to the outer part. The outer part comprises an inner cylindrical bore forming a rolling surface for rollers.

Generally, two radial bearing assemblies are provided on a balancing shaft. Both assemblies are axially slid around the balancing shaft from one free end of the shaft, positioned and then fixed in two axial locations of shaft. To ease the assembly of the radial bearing assemblies, the respective inner cylindrical bores of the two outer parts have different inner diameters. The inner diameter of the inner cylindrical bore of an outer part of a first radial bearing assembly close to the shaft free end is strictly greater than the inner diameter of the inner cylindrical bore of an outer part of a second radial bearing assembly that is axially offset with respect to the free end. The difference between the diameters is generally about 0.5 to 1 mm. A cage provided with rollers can then be axially passed through the outer part of the first radial bearing assembly of larger diameter and then be installed with the outer part of the second radial bearing assembly of reduced diameter. Another cage provided with rollers is then installed with the outer part of the first radial bearing assembly. However, the two cages need to be of different diameters, the cage dedicated for the second radial bearing assembly being of reduced diameter with respect to the cage dedicated for the first radial bearing assembly.

Consequently, two different types of cages have to be provided to a balancing shaft application that require to double the stock management, manufacturing and increase costs. Moreover, and even if the cage types are advantageously each well identified by marking, there are very similar with only a slight diameter difference, and it is easy to invert them. This is time consuming for an operator to select the good cage and a potential source of mounting errors, and then risks of failure of radial bearing assemblies during the balancing shaft operation.

SUMMARY

The aim of the invention is to solve the above difficulties. It is proposed a bearing cage for rolling-element bearings that is standardized and suitable for different diameters, more particularly for an easy and reliable mounting process of radial bearing assemblies to a rotating shaft.

To this end, the invention relates to a bearing cage for rolling-element bearings that is annular and centered on a central axis, the bearing cage comprising a plurality of circumferentially adjacent pockets dedicated to receive each a rolling element, the bearing cage being split in the circumferential direction along a line of separation so as to define a first side and a second side that are circumferentially separated from each other, the first side and second side having fixing means to fix the first side and second side to each other.

According to the invention, at least one of the first and second sides comprises at least one projection extending in the circumferential direction towards the other side, the other side comprising a recess configured to receive the projection in the circumferential direction so as to fix the first side and second side to each other in at least a first direction. A concave portion extends in one direction from a first mounting surface defined on one of the at least one projection and recess, and at least two convex portions are provided to a second mounting surface defined on the other of the at least one projection and recess, the convex portions being circumferentially offset one to each other, the first and second mounting surfaces being mutually-opposable surfaces. Each of the convex portions is configured to receive the concave portion so as to fix the first side and second side to each other in at least the circumferential direction, the bearing cage having a different diameter when the concave portion is engaged with a different convex portion.

Thanks to the invention, the same cage can be set at least with two different diameters. It is particularly of interest with balancing shaft applications where two cages of different but close diameters are used. It also permits the use of a standardized cage for a plurality of rolling-element bearings of different dimensions.

According to further aspects of the invention which are advantageous but not compulsory, such a bearing cage may incorporate one or several of the following features:

The bearing cage is provided with two pairs of a projection and a corresponding recess.

A first side of the bearing cage comprises two projections, and the second side of the bearing cage comprises two recesses each configured to receive one of the projections.

A first side of the bearing cage comprises a first projection and a first recess, and the second side of the bearing cage comprises a second recess configured to receive the first projection, and a second projection configured to be arranged in the first recess.

One pair of a projection and a corresponding recess are disposed on one axial edge of bearing cage.

At least one projection has a rectangular cross section in directions both perpendicular and parallel to the central axis of bearing cage, and the corresponding recess has also a rectangular cross section in directions both perpendicular and parallel to the central axis of bearing cage, such that the projection and the recess are of complementary shapes, the rectangular shapes preventing rotation therebetween.

At least one projection has a rectangular cross section extending on the entire radial thickness of bearing cage, and the corresponding recess is of complementary shape and extends radially through the thickness of bearing cage.

At least one projection is a tongue circumferentially extending from one of the first and second sides, and the corresponding recess is of complementary shape.

The first mounting surface having the concave portion is provided to a projection, and the second mounting surface having the convex portions is provided to the corresponding recess.

The first mounting surface having the concave portion is provided to a recess, and the second mounting surface having the convex portions is provided to the corresponding projection.

The concave portion is one tooth-like projection of inclined edges and extending along the entire first mounting surface, and the convex portions are recesses defined by a serration having at least two tooth-like projections of inclined edges and extending along the entire second mounting surface, such that the concave portion and the convex potions are of complementary shapes.

The concave portion is a bulge of essentially half-circular shape, and the convex portions are recesses, such that the concave portion and the convex potions are of complementary shapes.

The concave portion is of essentially semi-circular or circular shape provided to a free end of a circumferential extent of the first mounting surface, and the convex portions are spherical recesses provided in a slot extending circumferentially in bearing cage from the second mounting surface, the spherical recesses being circumferentially offset one to each other within the slot, such that the slot is adapted to receive the circumferential extent and each of the spherical recesses is adapted to receive the concave portion of essentially semi-circular or circular shape, the concave portion and the convex portions being of complementary shapes.

The concave portion and the convex portions extend radially and in opposite directions from a first and second mounting surfaces, respectively.

The concave portion and the convex portions extend axially and in opposite directions from a first and second mounting surfaces, respectively.

The cage is made from polymer material, for example polyamide 66, polyamide 45, polyetheretherketone (PEEK), or phenolic resin.

The cage is formed in one integral piece.

The invention also relates to a radial bearing assembly comprising a fixed outer part, a rotating shaft of rotating axis and provided with an inner part, rolling elements radially arranged between the outer part and inner part and rolling with line contact on surfaces of the inner and outer parts, the rolling elements being arranged in pockets of an annular cage according to any of the preceding embodiments, the cage being housed between the outer and inner parts so as to maintain the rolling elements axially and circumferentially equally spaced.

According to further aspects of the invention which are advantageous but not compulsory, such a radial bearing assembly may incorporate one or several of the following features:

The rolling elements are rollers.

The inner part is formed integrally with the rotating shaft.

The inner part is a separate element and is assembled on the rotating shaft.

The rotating shaft is a balancing shaft.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
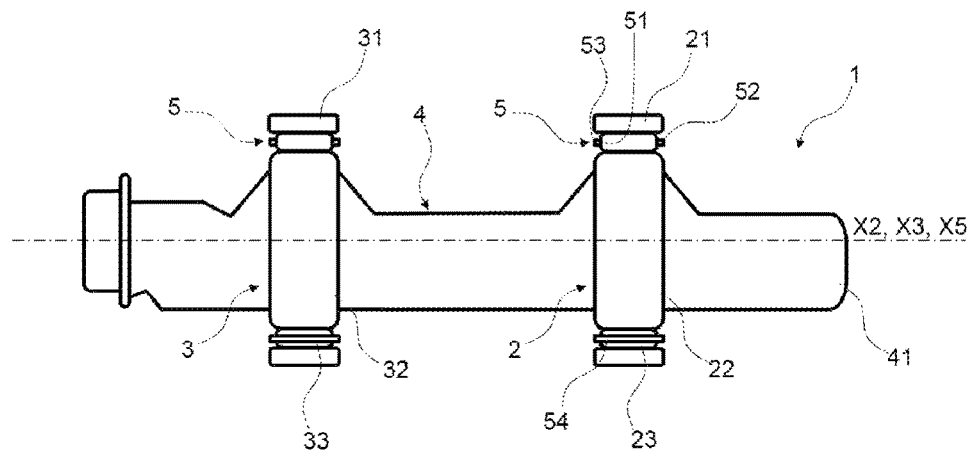
FIG. 1 is a schematic side view of part of a radial bearing assembly.

The assembly 1 represented on FIG. 1 comprises two radial bearing assemblies 2, 3 adapted to support a shaft 4, in particular a balancing shaft in a piston engine of a motor vehicle, the shaft being an eccentric weighted shaft that offsets vibrations in the engine.

The first radial bearing assembly 2 comprises a fixed outer part 21, here an outer ring, an inner part 22 fast in rotation with the shaft 4, and a plurality of rolling elements 23 that are arranged between the inner and outer parts, and an annular cage 5 to maintain the rolling elements 23.

Outer part 21 and inner part 22 are centered on a common longitudinal axis X2. The outer part 21 is stationary and the inner part 22 is rotating with the shaft 4 around the longitudinal axis X2. The inner part 22 is formed integral with the shaft 4. Alternatively, the inner part 22 is an element mounted and fixed to the shaft 4.

Hereinafter, to facilitate the special identification of the assembly 1 for this figure and for the following ones, the adjectives "axial" and "radial" and the adverbs "axially" and "radially" are defined relative to the axis X2. Thus, an axial portion or part is parallel to the axis X2, whilst a radial portion or part is perpendicular to the axis X2.

The outer part 21 comprises an inner bore forming a rolling surface for the rolling elements 23 along a contact line. The inner part 22 comprises an outer surface forming a rolling surface for the rolling elements 23 along a contact line.

Here the rolling elements 23 can have a cylindrical shape, such as needle rollers as illustrated in FIG. 1. Alternatively, it is also possible to use tapered or toroidal rolling elements. Alternatively, the roller bearing design may also include a double row bearing, e.g. a double row needle roller bearing.

Rolling elements 23 are each arranged in pockets 51 circumferentially provided on cage 5. The cage 5 is annular and of central axis X5 common with axis X2 of first radial bearing assembly 2. Pockets 51 are axially comprised between two annular heels 52, 53 of cage 5. Cage heels 52, 53 define each axial edges of cage 5 that are preferably radially aligned with corresponding axial edges of inner part 22. Pockets 51 are circumferentially separated each other by bridges 54 extending in the axial direction.

The second radial bearing assembly 3 is preferably of similar construction as the first bearing assembly, the second radial bearing assembly 3 being axially offset with respect to the first radial bearing assembly 2.

The second radial bearing assembly 3 comprises a fixed outer part 31, here an outer ring, an inner part 32 fast in rotation with the shaft 4, and a plurality of rolling elements 33 that are arranged between the inner and outer parts, and an annular cage 5 to maintain the rolling elements 33. The cages 5 of the two radial bearing assemblies 2, 3 are identical. Only of the cages will be further described.

Outer part 31 and inner part 32 are centered on a common longitudinal axis X3. The outer part 31 is stationary and the inner part 32 is rotating with the shaft 4 around the longitudinal axis X3. In normal service use of the assembly 1, the axis X2 and X3 are common.

The outer part 31 comprises an inner bore forming a rolling surface for the rolling elements 33 along a contact line. The inner part 32 comprises an outer surface forming a rolling surface for the rolling elements 33 along a contact line.

As a common use, the respective inner bores of the two outer parts 21, 31 have different inner diameters to ease the assembly of the radial bearing assemblies 2, 3. The inner diameter of the inner bore of the outer part 21 of the first radial bearing assembly 2 close to a shaft free end 41 is strictly greater than the inner diameter of the inner bore of the outer part 31 of the second radial bearing assembly 3 that is axially offset with respect to the free end 41. The difference between the diameters is generally about 0.5 to 1 mm.

Figure 2:
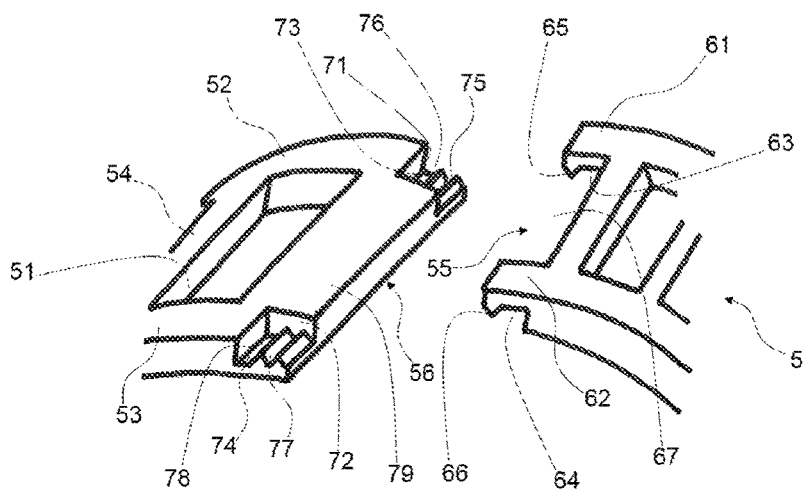
FIG. 2 is a three-dimensional representation of a split bearing cage in the open state, according to a first exemplary embodiment of the invention.
Figure 3A:
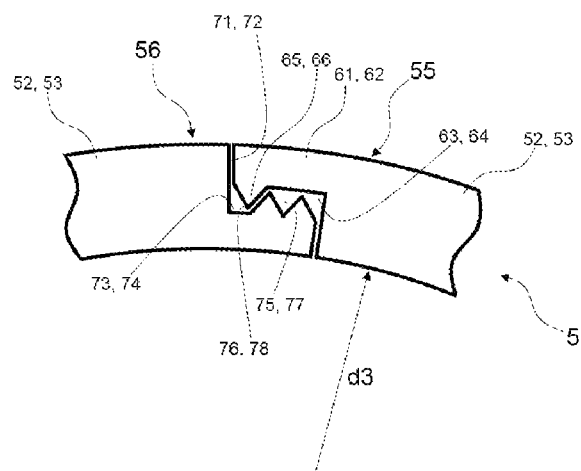
FIGS. 3a and 3b are enlarged top views of the cage in a first and a second closed states, respectively.
Figure 3B:
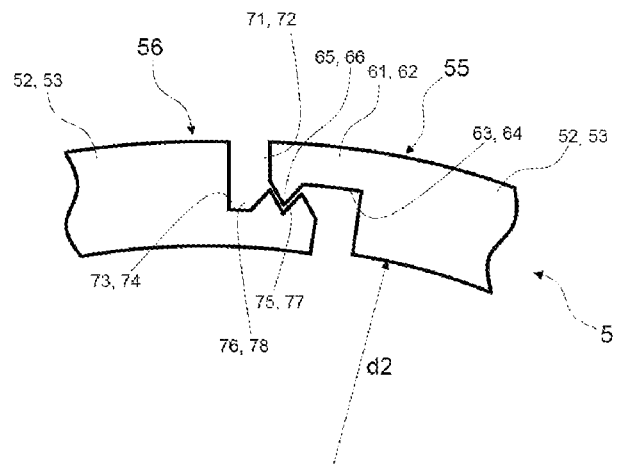

According to a first exemplary embodiment of the invention illustrated in FIGS. 2, 3a and 3b, the cage 5 is split in the circumferential direction along a line of separation so as to define a first side 55 and a second side 56 that are circumferentially separated from each other, the first side 55 and second side 56 having fixing means to fix the first side and second side to each other.

The first side 55 comprises two projections 61, 62 that circumferentially extend from the side 55 towards the other side 56. Projections 61, 62 are provided on each axial edges 52, 53 respectively of cage 5, a central opening 67 being defined between the projections 61, 62. In the present embodiment, projections 61, 62 are identical and are each tongues of rectangular shape in cross section in directions both perpendicular and parallel to the central axis X5 of cage 5. The lower radial sides of projections 61, 62 define mounting surfaces 63, 64, respectively.

The second side 56 comprises two recesses 71, 72 configured to receive the projections 61, 62, respectively, of first side 55. Recesses 71, 72 are formed in the radial and circumferential thickness of cage 5. Recesses 71, 72 are provided on each axial edges 52, 53 respectively of cage 5, a central portion 79 of cage 5 being defined axially between the recesses 71, 72 and configured to be arranged in opening 67 of first side 55. Recesses 71, 72 are identical and are each of rectangular cross section in directions both perpendicular and parallel to the central axis X5 of cage 5, such that recesses 71, 72 are of corresponding shape with projections 61, 62. The upper radial sides of recesses 71, 72 define mounting surfaces 73, 74, respectively, the first and second mounting surfaces 63 and 73, 64 and 74, being mutually-opposable surfaces.

When assembled together, the projections 61, 62 of first side 55 of cage 5 are arranged in the corresponding recesses 71, 72, respectively, of second side 56, and central portion 79 of second side 56 is arranged in central opening 67 of first side 55. The first and second sides are then fixed together in an axial direction.

According to the invention, the first mounting surfaces 63, 64 of projections 61, 62 of first side 55 comprise each one concave portion 65, 66, respectively.

In the present embodiment, the concave portions consist each in one tooth-like projection 65, 66, respectively, of inclined edges and extending along the entire first mounting surface 63, 64. The tooth-like projections 65, 66 are preferably formed at a free end of projection 61, 62.

The second mounting surfaces 73, 74 of recesses 71, 72 of second side 56 comprise each two convex portions 75, 76 and 77, 78.

The convex portions are recesses 75, 76 and 77, 78 defined by a serration having two tooth-like projections of inclined edges and extending along the entire second mounting surface. For each pair of a projection 61, 62 and a recess 71, 72, the concave portion 65, 66 and the corresponding convex potions 75, 76 and 77, 78 are of complementary shapes.

The convex portions 75, 76 and 77, 78 are circumferentially separated each other by a given length, the convex portions 75, 77 being closer to the free end of second side 56 than the convex portions 76, 78, respectively.

As illustrated in the FIG. 3a, the first side 55 and the second side 56 of split cage 5 can be fixed together in a first closed state by cooperation of the concave portion 65 of projection 61 of first side 55 with the convex portion 76 of recess 71 of second side 56, and by cooperation of the concave portion 66 of projection 62 of first side 55 with the convex portion 78 of recess 72 of second side 56. In this first closed state, the cage 5 has a first diameter d3 suitable for being installed with the outer part 31 of second radial bearing assembly 3 of assembly 1.

As illustrated in FIG. 3b, the first side 55 and the second side 56 of split cage 5 can be fixed together in a second closed state by cooperation of the concave portion 65 of projection 61 of first side 55 with the convex portion 75 of recess 71 of second side 56, and by cooperation of the concave portion 66 of projection 62 of first side 55 with the convex portion 77 of recess 72 of second side 56. In this second closed state, the cage 5 has a second diameter d2 suitable for being installed with the outer part 21 of second radial bearing assembly 2 of assembly 1.

Diameter d3 of cage 5 is strictly smaller than diameter d2. Cage 5 in the first closed state can be passed through the outer part 21 of first radial bearing assembly 2 of higher diameter, and then be installed with outer part 31 of second radial bearing assembly 3 of reduced diameter compared to first radial bearing assembly 2.

Thanks to the invention, two identical cages 5 can be installed in both radial bearing assemblies 2, 3 of different dimensions.

As an alternate not shown, the first side 55 of cage 5 comprises one projection and one recess, and the second side 56 comprises one corresponding recess and one corresponding projection, respectively.

As an alternate not shown of the present embodiment, the pairs of projections 61, 62 and recesses 71, 72 can be rotated of 90°.

As an alternate not shown, the recesses may be provided each with one concave portion consisting in a tooth-like projection, and the projections may be provided each with two convex portions formed by a serration having at least two tooth-like projections.

Figure 4:
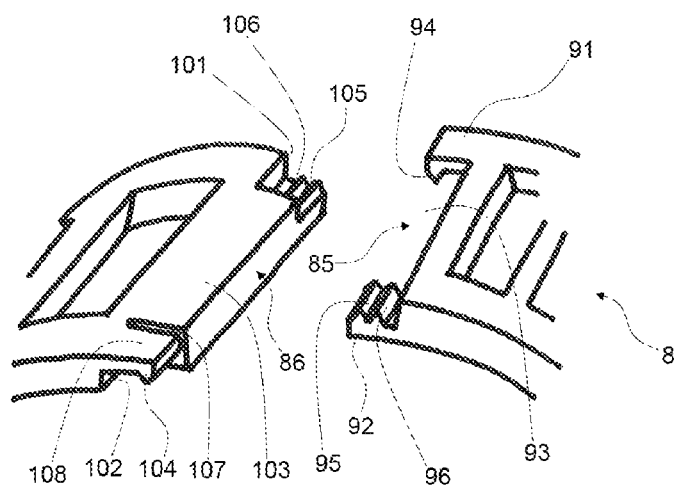
FIG. 4 is a three-dimensional representation of a split bearing cage in the open state, according to a second exemplary embodiment of the invention.

A second exemplary embodiment of the present invention is illustrated in FIG. 4, and discloses a cage 8 that differs from the cage 5 of the first embodiment.

The cage 8 is split in the circumferential direction along a line of separation so as to define a first side 85 and a second side 86 that are circumferentially separated from each other, the first side 85 and second side 86 having fixing means to fix the first side and second side to each other.

The first side 85 comprises two projections 91, 92 that circumferentially extend from the side 85 towards the other side 86. Projections 91, 92 are provided on each axial edges of cage 8, a central opening 93 being defined in-between, and formed on opposite radial faces of cage 8. In the present embodiment, projection 91 is a tongue of rectangular cross section in directions both perpendicular and parallel to the central axis of cage 8, and comprises a tooth-like projection 94 radially inwardly directed. Projection 92 comprises two convex portions 95, 96 defined by a serration having at least two tooth-like projections of inclined edges and radially outwardly directed.

The second side 86 comprises two recesses 101, 102 adapted to receive the projections 91, 92, respectively. Recesses 101, 102 are formed in the radial and circumferential thickness of cage 8. Recesses 101, 102 are provided on each axial edges of cage 5, a central portion 103 of cage 8 being defined axially between the recesses 101, 102 and configured to be arranged in opening 93 of first side 85. Recess 101 is of rectangular cross section in directions both perpendicular and parallel to the central axis of cage 8, and comprises two convex portions 105, 106 defined by a serration having at least two tooth-like projections of inclined edges and radially outwardly directed. Recess 102 is of rectangular cross section in directions both perpendicular and parallel to the central axis of cage 8, and comprises a tooth-like projection 104 radially inwardly directed. A slot 107 is formed so as to define a tongue 108 with recess 102.

When assembled together, the projection 94 of first side 85 of cage 8 is arranged in the corresponding recess 101 of second side 56, the projection 92 of first side 85 is arranged in the corresponding recess 102 of second side 86, and central portion 103 of second side 86 is arranged in central opening 93 of first side 85. The first and second sides are then fixed together in an axial direction.

The first side 85 and the second 86 of split cage 8 can be fixed together in a first closed state by cooperation of the concave portion 94 of projection 91 of first side 85 with the convex portion 106 of recess 101 of second side 86, and by cooperation of the concave portion 104 of tongue 108 in recess 102 of second side 86 with the convex portion 96 of recess 92 of first side 85. In this first closed state, the cage 8 has a first diameter d3.

The first side 85 and the second 86 of split cage 8 can be fixed together in a second closed state by cooperation of the concave portion 94 of projection 91 of first side 85 with the convex portion 105 of recess 101 of second side 86, and by cooperation of the concave portion 104 of tongue 108 in recess 102 of second side 86 with the convex portion 95 of recess 92 of first side 85. In this second closed state, the cage 8 has a first diameter d2 strictly greater than d3 in the first closed state.

Figure 5:
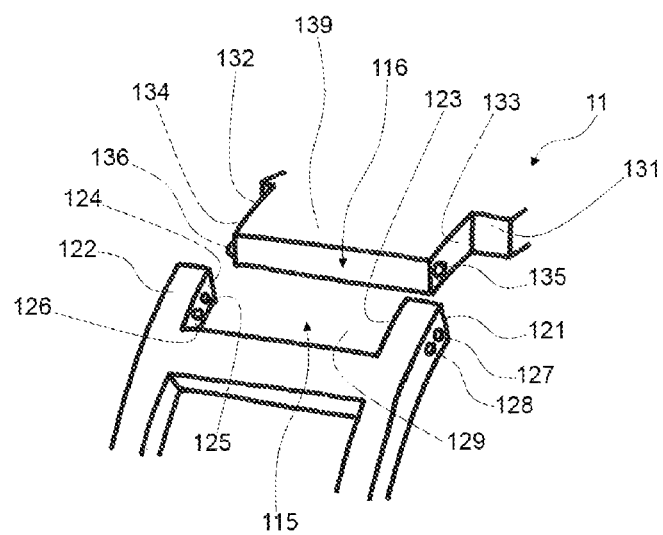
FIG. 5 is a three-dimensional representation of a split bearing cage in the open state, according to a third exemplary embodiment of the invention.
Figure 6A:
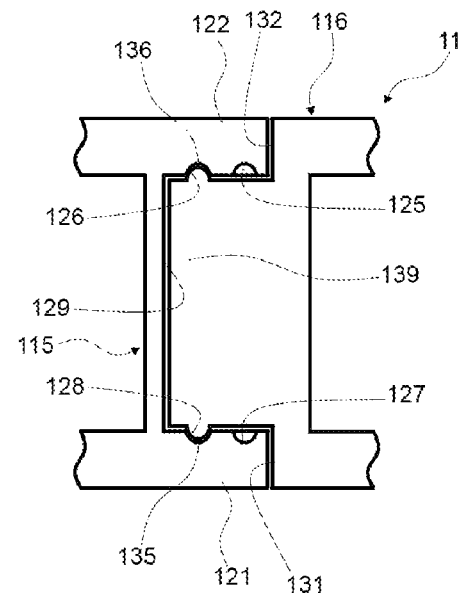
FIGS. 6a and 6b are enlarged top views of the cage in a first and a second closed states, respectively.
Figure 6B:
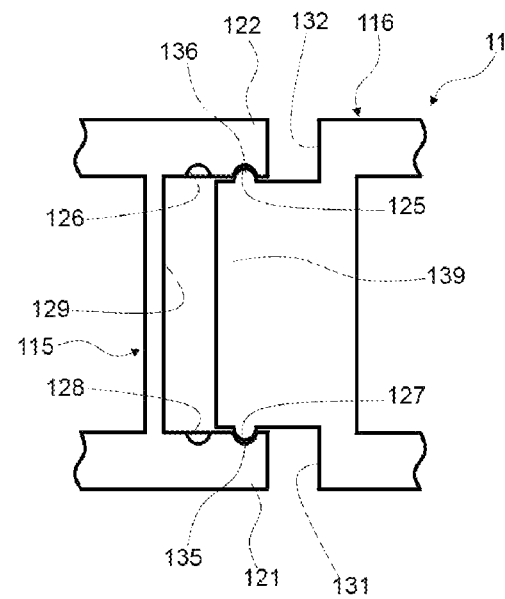

A third exemplary embodiment of the present invention is illustrated in FIGS. 5, 6a and 6b, and discloses a cage 11 that differs from the cages 5 and 8 of the previous embodiments.

The cage 11 is split in the circumferential direction along a line of separation so as to define a first side 115 and a second side 116 that are circumferentially separated from each other, the first side 115 and second side 116 having fixing means to fix the first side and second side to each other.

The first side 115 comprises two projections 121, 122 that circumferentially extend from the side 115 towards the other side 116. Projections 121, 122 are provided on each axial edges of cage 11, a central opening 129 being defined between the projections 121, 122. In the present embodiment, projections 121, 122 are identical and are each of rectangular shape in cross section in directions both perpendicular and parallel to the central axis of cage 11, and extending on the entire radial thickness of bearing cage 11. The inner axial sides of projections 121, 122 define mounting surfaces 123, 124, respectively.

The second side 116 comprises two recesses 131, 132 configured to receive the projections 121, 122, respectively, of first side 115. Recesses 131, 132 are identical and are each of rectangular cross section in directions both perpendicular and parallel to the central axis of cage 11, are formed through the entire radial thickness of cage 11 and are of complementary shape with projections 121, 122. Recesses 131, 132 are provided on each axial edges of cage 11, a central portion 139 of cage 11 being defined axially between the recesses 131, 132 and configured to be arranged in opening 129 of first side 115. The outer axial sides of recesses 131, 132 define mounting surfaces 133, 134, respectively, the first and second mounting surfaces 123 and 133, 124 and 134, being mutually-opposable surfaces.

When assembled together, the projections 121, 122 of first side 115 of cage 11 are arranged in the corresponding recesses 131, 132, respectively, of second side 116, and central portion 139 of second side 116 is arranged in central opening 129 of first side 115. The first and second sides are then fixed together in an axial direction.

According to the invention, the second mounting surfaces 133, 134 of recesses 131, 132 of second side 116 comprise each one concave portion 135, 136, respectively.

In the present embodiment, the concave portions 135, 136 consist each in one a bulge of essentially half-circular shape. The bulges 135, 136 are preferably formed close to a free end of recesses 131, 132.

The first mounting surfaces 123, 124 of projections 121, 122 of first side 116 comprise each two convex portions 125, 126 and 127, 128.

The convex portions are through openings 125, 126 and 127, 128. As an alternate not shown, the convex portions may be recesses of essentially half-circular shape. For each pair of a projection 121, 122 and a recess 131, 132, the concave portion 135, 136 and the corresponding convex potions 125, 126 and 127, 128 are of complementary shapes.

The convex portions 125, 126 and 127, 128 are circumferentially separated each other by a given length, the convex portions 125, 127 being closer to the free end of first side 116 than the convex portions 126, 128, respectively.

As illustrated in the FIG. 6a, the first side 115 and the second side 116 of split cage 11 can be fixed together in a first closed state by cooperation of the concave portion 135 of recess 131 of second side 116 with the convex portion 128 of projection 121 of first side 115, and by cooperation of the concave portion 136 of recess 132 of second side 116 with the convex portion 126 of projection 122 of first side 115. In this first closed state, the cage 11 has a first diameter d3 suitable for being installed with the outer part 31 of second radial bearing assembly 3 of assembly 1.

As illustrated in FIG. 6b, the first side 115 and the second side 116 of split cage 11 can be fixed together in a second closed state by cooperation of the concave portion 135 of recess 131 of second side 116 with the convex portion 127 of projection 121 of first side 115, and by cooperation of the concave portion 136 of recess 132 of second side 116 with the convex portion 125 of projection 122 of first side 115. In this second closed state, the cage 11 has a second diameter d2 suitable for being installed with the outer part 21 of second radial bearing assembly 2 of assembly 1, diameter d3 being strictly smaller than diameter d2.

As an alternate not shown, the concave portions may be provided in the recesses, and the convex portions may be provided to the projections.

Figure 7:
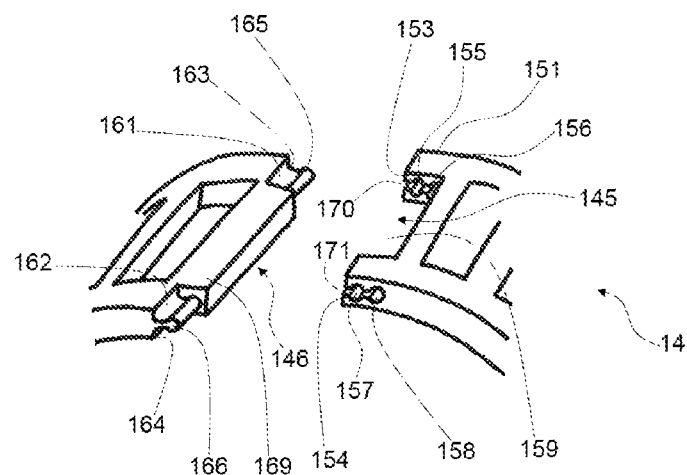
FIG. 7 is a three-dimensional representation of a split bearing cage in the open state, according to a fourth exemplary embodiment of the invention.
Figure 8A:
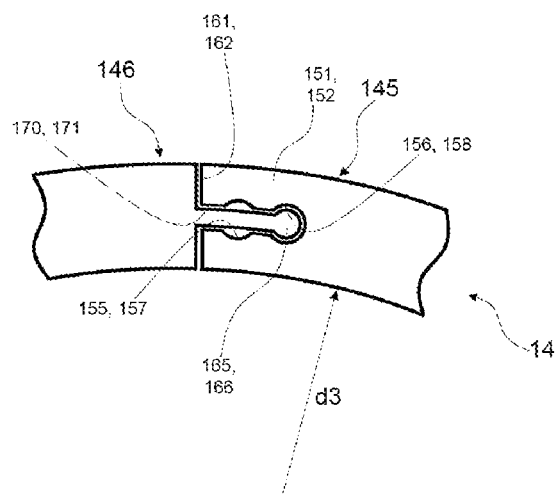
FIGS. 8a and 8b are enlarged top views of the cage in a first and a second closed states, respectively.
Figure 8B:
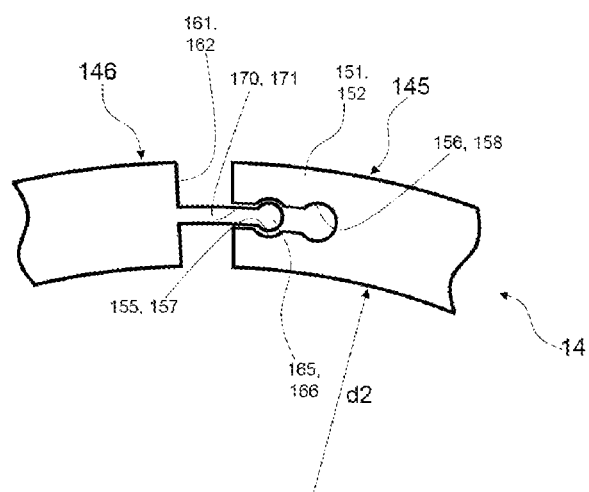

A fourth exemplary embodiment of the present invention is illustrated in FIGS. 7, 8a and 8b, and discloses a cage 14 that differs from the previous cages 5, 8 and 11 in the shapes of concave and convex portions.

The cage 14 is split in the circumferential direction along a line of separation so as to define a first side 145 and a second side 146 that are circumferentially separated from each other, the first side 145 and second side 146 having fixing means to fix the first side and second side to each other.

The first side 145 comprises two projections 151, 152 that circumferentially extend from the side 145 towards the other side 146. Projections 151, 152 are provided on each axial edges of cage 14, a central opening 159 being defined between the projections 151, 152. In the present embodiment, projections 151, 152 are identical and are each of rectangular shape in cross section in directions both perpendicular and parallel to the central axis of cage 14, and extending on the entire radial thickness of bearing cage 14. The front sides of projections 151, 152 define mounting surfaces 153, 154, respectively.

The second side 146 comprises two recesses 161, 162 configured to receive the projections 151, 152, respectively, of first side 145. Recesses 161, 162 are identical and are each of rectangular cross section in directions both perpendicular and parallel to the central axis of cage 14, are formed through the entire radial thickness of cage 14 and are of complementary shape with projections 151, 152. Recesses 161, 162 are provided on each axial edges of cage 14, a central portion 169 of cage 14 being defined axially between the recesses 161, 162 and configured to be arranged in opening 159 of first side 145. The front sides of recesses 161, 162 define mounting surfaces 163, 164, respectively, the first and second mounting surfaces 153 and 163, 154 and 164, being mutually-opposable surfaces.

When assembled together, the projections 151, 152 of first side 145 of cage 14 are arranged in the corresponding recesses 161, 162, respectively, of second side 146, and central portion 169 of second side 146 is arranged in central opening 159 of first side 145. The first and second sides are then fixed together in an axial direction.

According to the invention, the second mounting surfaces 163, 164 of recesses 161, 162 of second side 146 comprise each one concave portion 165, 166, respectively.

In the present embodiment, the concave portions 165, 166 are each of essentially semi-circular or circular shape provided to a free end of a circumferential extent of the first mounting surface 163, 164, respectively. The ends of semi-circular or circular shape 165, 166 are preferably formed close to a free end of recesses 161, 162.

The first mounting surfaces 153, 154 of projections 151, 152 of first side 146 comprise each two convex portions 155, 156 and 157, 158.

The convex portions 155, 156 are spherical recesses provided in a slot 170 extending circumferentially in bearing cage 14 from the second mounting surface 154. Similarly, the convex portions 157, 158 are spherical recesses provided in a slot 171 extending circumferentially in bearing cage 14 from the second mounting surface 154. The spherical recesses 155, 156 and 157, 158 of a pair are circumferentially offset one to each other within slot 170, 171. The slot 170, 171 is adapted to receive the circumferential extent provided in recess 161, 162, respectively, and each of the spherical recesses 155, 156 and 157, 158 is adapted to receive the concave portion of essentially semi-circular or circular shape 165, 166, respectively, the concave portion and the convex portions of each corresponding pair being of complementary shapes.

As illustrated in the FIG. 8a, the first side 145 and the second side 146 of split cage 14 can be fixed together in a first closed state by cooperation of the concave portion 165 of recess 161 of second side 146 with the convex portion 156 of projection 151 of first side 145, the extent of concave portion 165 being arranged in slot 170, and by cooperation of the concave portion 166 of recess 162 of second side 146 with the convex portion 158 of projection 152 of first side 145, the extent of concave portion 166 being arranged in slot 171. In this first closed state, the cage 14 has a first diameter d3 suitable for being installed with the outer part 31 of second radial bearing assembly 3 of assembly 1.

As illustrated in FIG. 8b, the first side 145 and the second side 146 of split cage 14 can be fixed together in a second closed state by cooperation of the concave portion 165 of recess 161 of second side 146 with the convex portion 156 of projection 151 of first side 145, the extent of concave portion 165 being arranged in slot 1701, and by cooperation of the concave portion 166 of recess 162 of second side 146 with the convex portion 158 of projection 152 of first side 145, the extent of concave portion 166 being arranged in slot 171. In this second closed state, the cage 14 has a second diameter d2 suitable for being installed with the outer part 21 of second radial bearing assembly 2 of assembly 1, diameter d3 being strictly smaller than diameter d2.

Exemplary embodiments of the bearing cages 5, 8, 11, 14 described herein can for example be manufactured from a plastic material, such as polymer. For example, the split bearing cages can be manufactured using a polymer injection-molding process, for example including polyamide 66, polyamide 45, polyetheretherketone (PEEK), or phenolic resin.

As an alternate not shown, the first side may comprise one such projection and one such recess, and the second side may comprise one corresponding recess and one corresponding projection, respectively, of complementary shapes.

As an alternate not shown, more than two convex portions may be provided and are circumferentially offset one to each other for permitting to set the cage with more than two different diameters.

Of course, the shape and dimensions of the projections and recesses described in the present specification can also be chosen quite differently, in order to adapt the stepped split bearing cage design to a radial, tangential, and/or axial loads of a particular application of the present teachings. Thus, for example, only one central pair of a projection and a recess can be provided, or a plurality of pairs of a projection and a recess disposed between the bearing axial edges.

Representative, non-limiting examples of the present invention were described above in details with reference to the attached drawings. This details description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved bearing cages and radial bearing assemblies.

Even if the exemplary embodiments described above only relate to the balancing shaft application, it is to be understood that the present invention can be used to any other suitable applications, and to any other types of rolling-element bearings.

Moreover, various features of the above-described representative examples, as well as the various independent and dependent claims below, may be combined in ways that are not specifically and explicitly enumerated in order to provide additional useful embodiments of the present teachings.

What is claimed is:

1. A bearing cage for rolling element bearings, that is annular and centered on a central axis, the bearing cage comprising:
    a plurality of circumferentially adjacent pockets dedicated to each receive a rolling element, the bearing cage being split in the circumferential direction along a line of separation so as to define a first side and a second side that are circumferentially separated from each other, the first side and the second side having fixing means to fix the first side and second side to each other, wherein
    the fixing means comprises: at least one of the first and second sides comprising at least one projection extending in the circumferential direction towards the other side, the other side comprising a recess configured to receive the projection in the circumferential direction so as to fix the first side and second side to each other in at least a first direction,
    a concave portion extends in one direction from a first mounting surface defined on one of the at least one projection and recess, and at least two convex portions are provided on a second mounting surface defined on the other of the at least one projection and recess, the convex portions being circumferentially offset one to each other, the first and second mounting surfaces being mutually-opposable surfaces, and
    each of the convex portions is configured to receive the concave portion so as to fix the first side and second side to each other in at least the circumferential direction, the bearing cage having a different diameter when the concave portion of the convex portions is engaged with a different convex portion.

2. The bearing cage according to claim 1, wherein the at least one projection has a rectangular cross section in directions both perpendicular and parallel to the central axis of bearing cage, and the corresponding recess has also a rectangular cross section in directions both perpendicular and parallel to the central axis of bearing cage, such that the projection and the recess are of complementary shapes, the rectangular shapes preventing rotation therebetween.

3. The bearing cage according to claim 1, wherein the at least one projection is a tongue circumferentially extending from one of the first and second sides, and the corresponding recess is of complementary shape.

4. The bearing cage according to claim 1, wherein the concave portion is one tooth-like projection of inclined edges and extending along the entire first mounting surface, and the convex portions are recesses defined by a serration having at least two tooth-like projections of inclined edges and extending along the entire second mounting surface, such that the concave portion and the convex potions are of complementary shapes.

5. The bearing cage according to claim 1, wherein the concave portion is a bulge of essentially half-circular shape, and the convex portions are recesses, such that the concave portion and the convex potions are of complementary shapes.

6. The bearing cage according to claim 1, wherein the concave portion is semi-circular or circular in shape and is provided on a free end of a circumferential extent of the first mounting surface, and the convex portions are spherical recesses provided in a slot extending circumferentially in bearing cage from the second mounting surface, the spherical recesses being circumferentially offset one to each other within the slot, such that the slot is adapted to receive the circumferential extent and each of the spherical recesses is adapted to receive the concave portion of the essentially semi-circular or circular shape, the concave portion and the convex portions being of complementary shapes.

7. The bearing cage according to claim 1, wherein the concave portion and the convex portions extend radially and in opposite directions from the first and second mounting surfaces, respectively.

8. The bearing cage according to claim 1, wherein he concave portion and the convex portions extend axially and in opposite directions from the first and second mounting surfaces, respectively.

9. A radial bearing assembly comprising:
    a fixed outer part,
    a rotating shaft having a rotating axis and provided with an inner part,
    rolling elements radially arranged between the outer part and the inner part and rolling with line contact on surfaces of the inner and outer parts, the rolling elements being arranged in pockets of an annular cage according to claim 1, the cage being housed between the outer part and inner part so as to maintain the rolling elements axially and circumferentially equally spaced.

10. The radial bearing assembly according to claim 9, wherein the rotating shaft is a balancing shaft.

* * * * *